United States Patent [19]
Silverman

[11] Patent Number: 5,829,834
[45] Date of Patent: Nov. 3, 1998

[54] CHILD'S AUTOMOBILE BOOSTER SEAT

[75] Inventor: Matthew H. Silverman, Concord, Mass.

[73] Assignee: Downunder Design, Inc., Concord, Mass.

[21] Appl. No.: 846,716

[22] Filed: Apr. 30, 1997

[51] Int. Cl.$^6$ ................................................ A47C 1/08
[52] U.S. Cl. ................. 297/250.1; 297/391; 297/DIG. 6
[58] Field of Search ............................ 297/250.1, 219.12, 297/483, 485, 473, 391, DIG. 6, 406, 397, 403, 219.1; 5/655, 653; 280/801.1, 808

[56] References Cited

U.S. PATENT DOCUMENTS

| | | | |
|---|---|---|---|
| 4,565,405 | 1/1986 | Mayer | 297/391 X |
| 4,854,639 | 8/1989 | Burleigh et al. | 297/483 X |
| 5,310,245 | 5/1994 | Lyszczasz | 5/655 X |
| 5,330,228 | 7/1994 | Krebs et al. | 297/483 X |
| 5,385,385 | 1/1995 | Silverman | 297/250.1 |
| 5,468,020 | 11/1995 | Scime | 297/219.12 X |
| 5,486,037 | 1/1996 | Harper | 297/219.12 X |
| 5,613,736 | 3/1997 | Schaked et al. | 297/404 X |

FOREIGN PATENT DOCUMENTS

| | | | |
|---|---|---|---|
| 589071 | 3/1994 | European Pat. Off. | 297/483 |

*Primary Examiner*—Milton Nelson, Jr.
*Attorney, Agent, or Firm*—Salzman & Levy

[57] ABSTRACT

A booster seat is designed that effectively integrates the shoulder belt of an automobile into the structure of the booster seat. The integration is accomplished by headrests, which are detachable at their lower end. The headrests are held to the booster body by adhesive or mating hook and loop pads. Each headrest is detachable from its respective mating adhesive pad affixed to the body of the booster, thus opening a space for an automobile seatbelt to be draped over the child sitting in the booster seat. The headrest is reattached to the body of the booster seat via the hook and loop pad, thus capturing the seatbelt between the headrest and the body of the booster seat. The belt is free to advance and retract within this integrated design.

3 Claims, 3 Drawing Sheets

CHILD'S AUTOMOBILE BOOSTER SEAT

FIELD OF THE INVENTION

The present invention relates to automobile booster seats for children and, more particularly, to an automobile booster seat that integrates existing shoulder belts of an automobile into the booster seat design.

BACKGROUND OF THE INVENTION

The design of a safe and comfortable booster seat for child passengers in an automobile is a difficult task. It can be observed that there are many different designs in the marketplace. This leaves one to conclude that the best safety design is still evolving.

One of the problems with booster seats is that comfort of the child is often compromised by safety considerations. Many booster seats try to balance the competing requirements for safety and comfort, and in so doing, provide a seat that is neither adequately comfortable, nor completely safe.

In U.S. Pat. No. 5,385,385, issued to Silverman on Jan. 31, 1995, for CHILD'S AUTOMOTIVE SAFETY BOOSTER SEAT WITH A VIEW, a booster seat for a youngster is shown. It combines soft and hard foam materials to create a child seat that is both comfortable and safe. The soft outer foam provides a comfortable cushioning for seating the child. The inner hard foam provides the structural rigidity needed for safety support. In addition, the soft materials allow the seat to bend and conform to the natural contours and angles of the back seat of a variety of different automobiles. This contouring integrates the booster seat with the interior of the car, making for a safer design by virtue of the melding of the seat with the frame and structure of the automobile.

Latest safety regulations and requirements dictate that, in addition to a safety booster, the child has to be fitted with the automobile's shoulder and lap belts. Many current seat designs use plastic clips or fabric loops extending from the head rests or body of the booster seat, to guide the shoulder belt about the infant. These guides aspire to position the belt across the shoulder and chest of the youngster, without touching his or her neck. In most instances, these clips work satisfactorily. Occasionally, however, the clips are positioned too high, and tend to lift the belt away from the seat. This heightened position increases belt extension from the retractor, and creates gaps at the point of contact with the child's chest and shoulders. Ideally, a seatbelt should have minimum extension from the retractor, and should lay flat, or directly drape upon the shoulder and chest of the youngster.

The present invention reflects the discovery that a new, integrated design for a seatbelt guide and holder can interleave the auto belt with the body of the booster seat. This integration is accomplished by providing headrests that are partially affixed to the body of the booster seat at their upper end. The headrests are detachable at their lower end, but are held in place by means of adhesive, or mating Velcro® strips or snap, or other fastener. The headrest is detached from the mating adhesive pad affixed to the body of the booster, thus opening a space for the automobile seatbelt to be draped over the child sitting in the booster seat. Thereafter, the headrest is reattached to the body of the booster seat via the Velcro® stripping. The seatbelt is now captured in a slot between the headrest and the body of the booster seat, where it is free to extend and retract as the child moves, but is nevertheless held in a set position. The belt, captured between the headrest and body of the booster, assumes proper positioning, so that the belt will naturally drape across the seat occupant (i.e., across the chest and shoulders of the youngster). Thus, the seatbelt becomes integrally interleaved within the headrest, which serves both to cushion the head of the child, and to capture and hold the seatbelt in place with respect to the child.

The integrated design is such that the belt extends only minimally from the retractor, and the belt will drape flatly across the shoulder and chest of the child without difficulty. The integrated belt does not have heightened extension, preserves the comfort of the child, and maintains precise safety standards.

The integrated belt guide of this invention eliminates one of the major drawbacks of the prior art plastic clips, or fabric loop guides. The clips and loops very often become entangled with, fouled, or enmeshed with the belt.

The new integrated belt guide allows the seatbelt to extend from the retractor smoothly, as the child leans forward, and thereafter smoothly retracts back into the retracting mechanism as the youngster settles back into the seat. Its flat and unextended design is smoothly operational, without tendency to foul or tangle.

SUMMARY OF THE INVENTION

In accordance with the present invention, there is provided a flexible booster seat for children, comprising side and headrests for comfortably positioning the child therein. The headrests of the booster seat are partially affixed to the body of the booster seat at their upper end. The headrests are detachable at their lower end, but are held in place by means of adhesive, or mating Velcro® strips or snaps or other fastener. The headrest is detached from the mating adhesive pad affixed to the body of the booster, thus opening a space for the automobile seatbelt to be draped over the child sitting in the booster seat. Thereafter, the headrest is reattached to the body of the booster seat via the Velcro® stripping. The seatbelt is now captured in a slot between the headrest and the body of the booster seat, where it is free to extend and retract as the child moves, but is nevertheless held in a set position. The belt, captured between the headrest and body of the booster, assumes proper positioning, so that the belt will naturally drape across the seat occupant (i.e., across the shoulder and chest of the youngster). Thus, the seatbelt becomes integrally interleaved within the headrest, which serves both to cushion the head of the child, and to capture and hold the seatbelt in place with respect to the child.

It is an object of this invention to provide an improved child booster seat.

It is another object of the invention to integrate a shoulder belt guide into the design of the booster seat body.

It is a further object of this invention to provide a shoulder belt guide for a child booster seat that will lay substantially flat against the shoulder and chest of the seat occupant.

It is yet another object of the invention to provide a guide and securement device for an automotive shoulder belt that is integrally configured with a booster seat, and which provides the minimum of retraction and extension from the belt retractor mechanism.

BRIEF DESCRIPTION OF THE DRAWINGS

A complete understanding of the present invention may be obtained by reference to the accompanying drawings, when considered in conjunction with the subsequent detailed description, in which.

For purposes of clarity and brevity, like elements and components of the invention will bear the same numerical designations throughout the figures.

DESCRIPTION OF THE PREFERRED EMBODIMENT

Generally speaking, the invention features a booster seat for seating a child within the back seat of an automobile. The booster seat is designed so that it effectively integrates the shoulder belt of an automobile into the structure of the booster seat. The integration is accomplished by the headrests, which are detachable at their lower end. The headrests are held to the booster body by means of adhesive, or mating Velcro® pads or snap, or other fastener. Each headrest is detachable from its respective mating adhesive pad affixed to the body of the booster, thus opening a space for an automobile seatbelt to be draped over the child sitting in the booster seat. The headrest is reattached to the body of the booster seat via the Velcro® pad, thus capturing the seatbelt between the headrest and the body of the booster seat. The belt is free to advance and retract within this integrated design. The interleaving of the belt within the booster seat provides for a minimum belt extension from the retractor. The design allows the belt to drape flatly across the shoulder and chest of the child.

Figure 1:
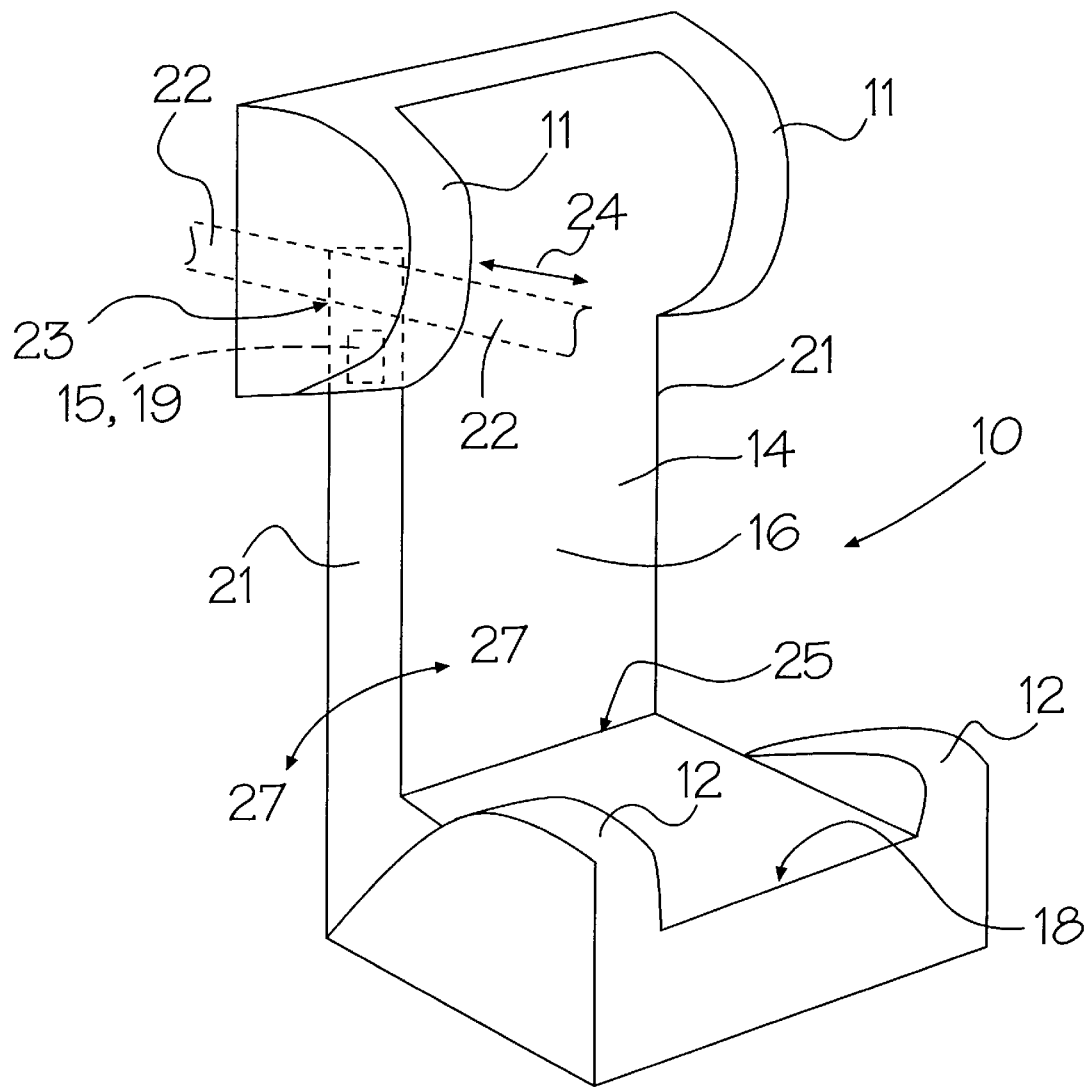
FIG. 1 depicts a perspective view of the booster seat of this invention, and an internal phantom view of the capturing mechanism by which the automobile seatbelt is integrally interleaved with, and captured within, the headrest of the booster seat.
Figure 3:
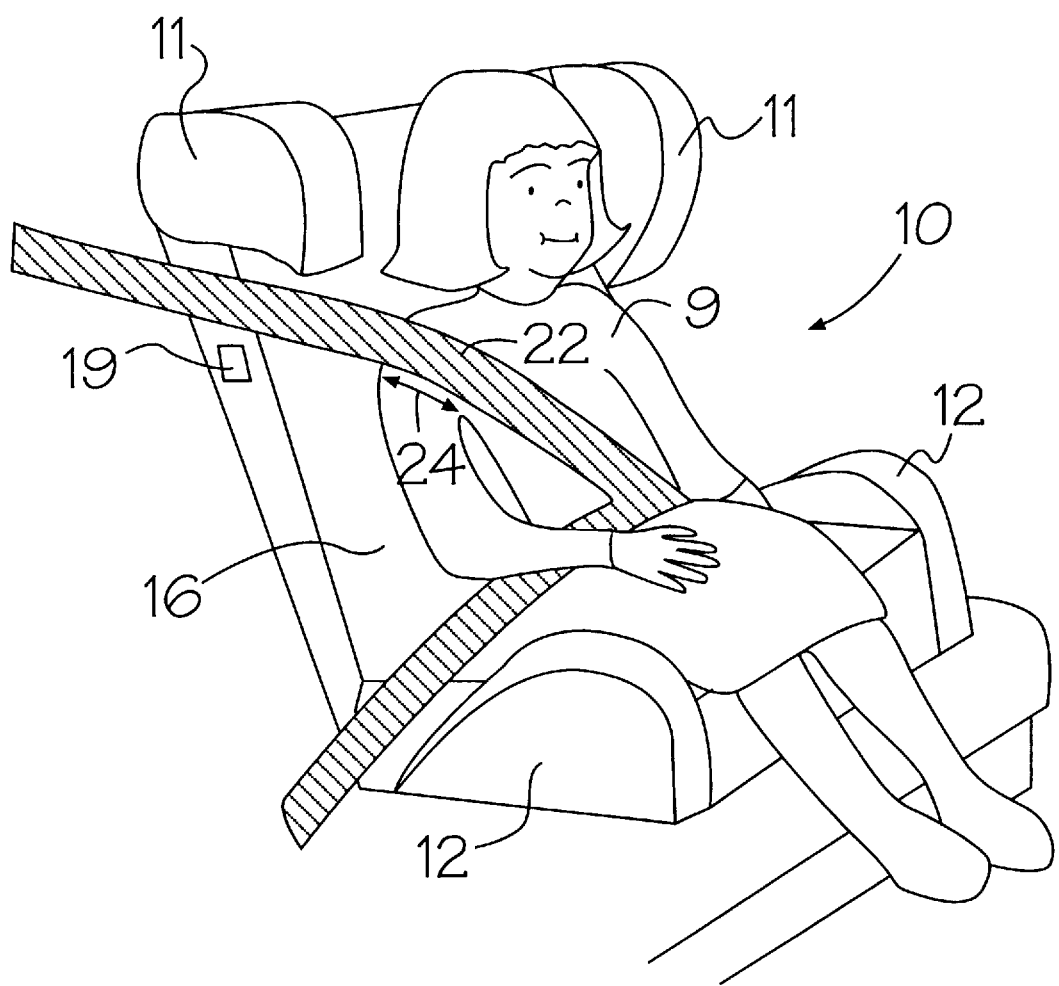
FIG. 3 illustrates a perspective, in situ, cut-away view of a child booster seat of this invention, depicting the shoulder belt as it drapes flatly across the child occupant of the booster seat.

Now referring to FIG. 1, the booster seat 10 of this invention is illustrated. The booster seat 10 is constructed of foam materials, as taught by, and in accordance with, U.S. Pat. No. 5,385,385, issued to Silverman, the teachings of which are meant to be incorporated herein by reference. The booster seat 10 has headrests 11 to constrain the side movements of the head of the child 9, sitting in the booster seat 10 (FIG. 3). The booster seat 10 also has side restraints 12 for cushioning the side movements of the child 9 about the legs. The lefthand headrest 11 is shown cut-away in FIG. 3, in order to illustrate how the automobile seatbelt 22 drapes flatly across the body of the child 9. The belt 22 is free to extend and retract (arrows 24), as the child 9 leans forward, and then relaxes back into the booster seat 10.

Figure 2:
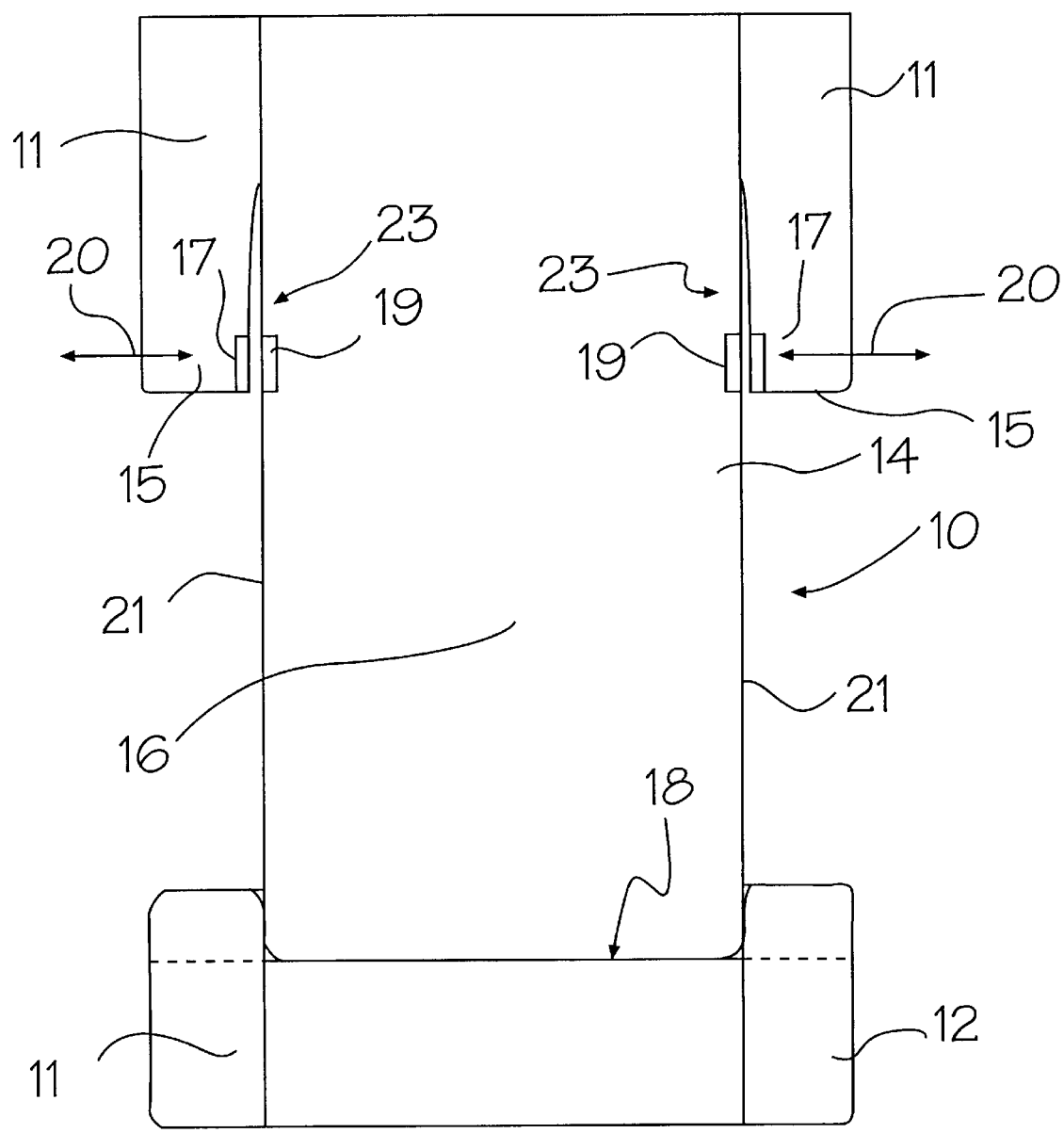
FIG. 2 shows a front view of the booster seat depicted in FIG. 1.

Referring to FIG. 2, a front view of the booster seat 10 is shown. It will be observed that each headrest 11 is only partially attached to the body 16 of the booster seat. A Velcro® hook and loop attachment pad 19 is secured to each side 21 of the body 16 of the booster seat 10, opposite the free end 15 of each of the respective headrests 11. The free end 15 of each headrest 11 comprises a mating Velcro® hook and loop attachment pad 17 disposed opposite the body Velcro® hook and loop attachment pad 15, as illustrated. Therefore, each headrest 11 can be removably unhooked from, and then reattached to, the pad 19, as shown by arrows 20 (FIG. 2), in order to capture the shoulder belt 22, when it is secured about the child 9.

A slot 23 is created between each headrest 11 and the body 16, in which the belt 22 can movably ride back and forth, as depicted by arrows 24. Thus, when the child 9 leans forward, the belt 22 will move forward with the child 9, and extend from its retractor mechanism (not shown). When the child 9 relaxes in the booster seat 10, such as when the youngster 9 leans backwards against the body 16, then the belt 22 will recoil back into the retractor mechanism, as is known in the art. The capture slot 23 created by the securement of the headrest 11 to the body 16 of the booster seat 10, allows for the smooth ingress and egress of belt 22 with respect to the retractor mechanism (arrows 24). The belt 22 will lay flat upon the shoulder and chest of the youngster 9.

The booster seat 10 can flex (arrows 27) about the crease 25 between the upright back portion 14 and the bottom seat portion 18. This flexure allows the booster seat 10 to conform to the particular angle of the back seat of the automobile, thus providing an integration with the automobile, and further enhancing the flattening of the shoulder belt 22 with respect to the child 9. The flatness likewise provides an integration between the body 16 of the seat and the extended belt 22. In operation, the belt 22 and the seat 18 act in conjunction with each other to provide a very effective restraint system, while maintaining child comfort.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A booster seat for a child, comprising a body portion having head rests disposed about said body portion for comfortably positioning a head of said child therein, each head rest of said booster seat having a first end, and a second end, each head rest being partially affixed to the body portion of said booster seat at said first end thereof, each head rest being detachable from said body portion of said booster seat at its respective second end, each of said head rests being held to said body portion by means of attachment means disposed therebetween, a first portion of each of said attachment means being fixedly secured to a respective head rest, and a second portion of each of said attachment means being fixedly secured to said body portion of said booster seat, each head rest being detachable from said body portion of said booster seat by separation of respective first and second portions of each attachment means, and means defining a space disposed between each of said attachment means and said first end of each of said head rests, said space allowing for an automobile seat belt to be draped over said child when sitting in said booster seat when a respective head rest is detached from said body portion, and wherein said respective head rest is reattachable to said body portion of said booster seat thus capturing said seat belt between said respective head rest and said body portion, and further wherein said automobile seat belt is free to advance and retract within said space.

2. A method of securing a shoulder belt about a child occupant seated within a booster seat disposed in an automobile, comprising the steps of:

a) partially detaching a headrest from said booster seat;

b) securing said shoulder belt of said automobile about said child occupant of the booster seat, said child resting upon a body portion of said booster seat; and c) thereafter, reattaching said headrest of said booster seat over the secured shoulder belt, thus creating a capturing slot between said headrest and the body portion of said booster seat, whereby said automobile seat belt is free to advance and retract with respect to said booster seat.

3. A booster seat for a child, comprising a body portion having at least one head rest disposed about said body portion for comfortably positioning a head of said child, said at least one head rest of said booster seat being partially affixed to the body portion of said booster seat about a first portion thereof, and being detachably affixed about a second portion thereof, means defining a space formed between said first portion and said second portion, said at least one head rest being partially detachable from said body portion of said booster seat about said second portion to allow an automobile seat belt to be draped over said child when sitting in said booster seat, said seat belt occupying said space when so draped, said at least one head rest being reattachable to said body portion of said booster seat, said automobile seat belt thereby being captured in said space between said at least one head rest and said body portion, whereby said automobile seat belt is free to advance and retract within said space.

* * * * *